INVENTORS
WILLIAM H. DORING
ROBERT E. BRINDLEY
BY
ATTORNEY

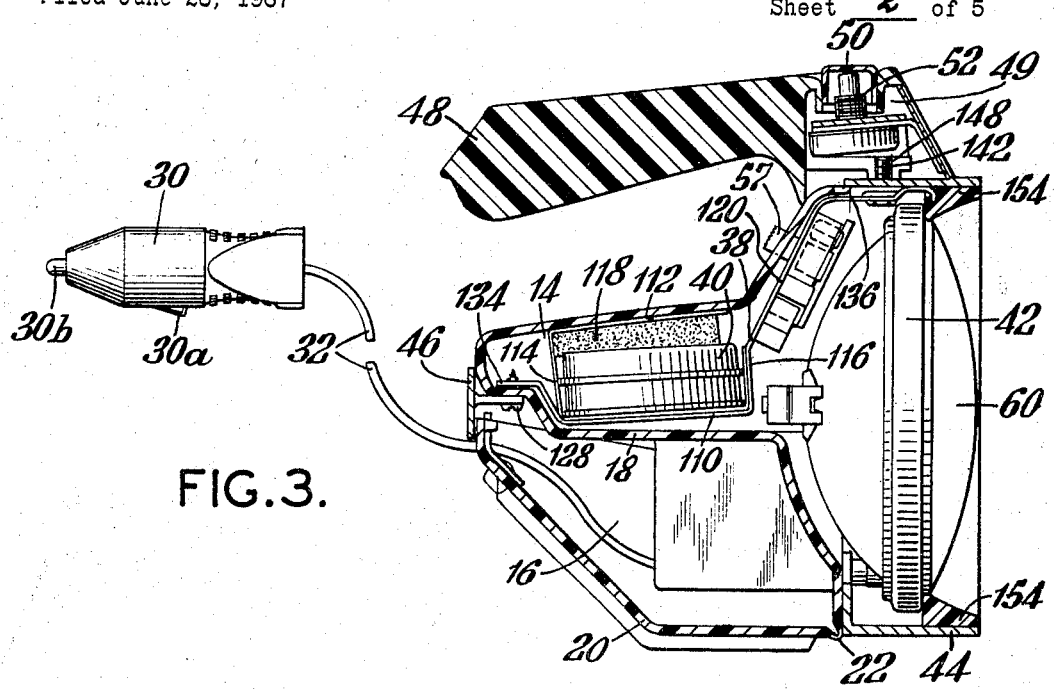
FIG.3.
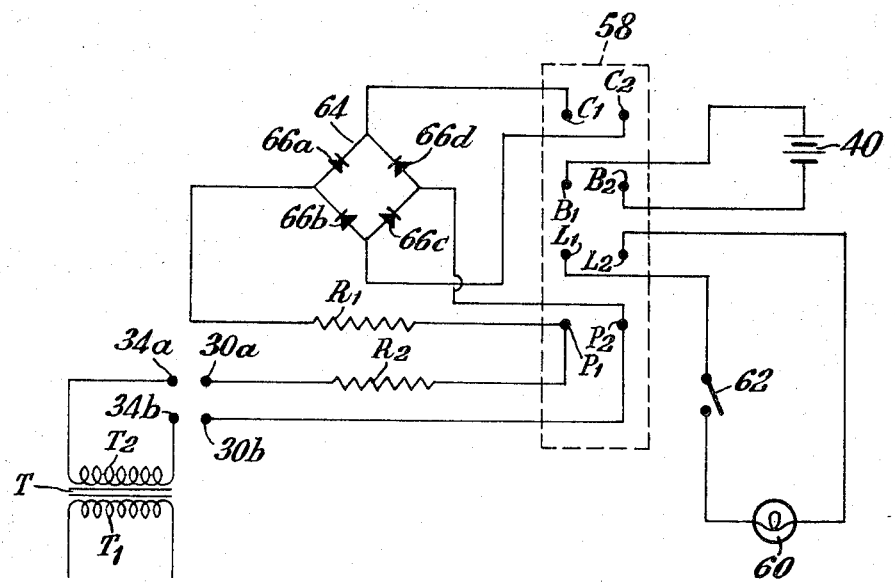
FIG.4.
INVENTORS
WILLIAM H. DORING
ROBERT E. BRINDLEY
BY 
ATTORNEY

United States Patent Office 3,441,730
Patented Apr. 29, 1969

3,441,730
PORTABLE RECHARGEABLE LIGHTING DEVICE
William H. Doring, Old Greenwich, Conn., and Robert E. Brindley, New York, N.Y., assignors to Union Carbide Corporation, a corporation of New York
Filed June 28, 1967, Ser. No. 649,631
Int. Cl. F21l 9/00
U.S. Cl. 240—10.63       10 Claims

ABSTRACT OF THE DISCLOSURE

A portable rechargeable lighting device featuring attractive appearance, ease and economy of assembly and manufacture together with versatility of operation. The device may be operated from internal batteries or an external current source such as an automobile cigarette lighter outlet. A storage compartment is provided with a plug and transformer assembly for recharging the battery or operating the device from external current means.

The present invention pertains to a portable lighting device which includes a self-contained rechargeable power source, and which may also be operated from an automobile battery by connection through a cigarette lighter outlet; more specifically, the invention involves a particular structure and arrangement for such a lighting device.

Background of the invention

The lighting device of the present invention involves a high volume consumer item, commonly referred to as a flashlight or hand lantern, and it is of significance that such items comprise features which will enhance their attractiveness to the consumer while also enabling manufacture at relatively low cost. The sale price of such an item can be the dominant factor in its economic success, and a structural configuration which provides ease of manufacture at the lowest cost would contribute greatly to such success. It would be particularly desirable if such an item could simultaneously provide an appealing, attractive appearance as well as good variety of improved operational features. Therefore, the combination of ease and simplicity of assembly and manufacture, attractiveness of design enhancing saleability, and operational versatility, all provided in a unit which can be appropriately priced, would result in a significantly advantageous commercial item.

Accordingly, it is an object of the present invention to provide an operationally versatile portable lighting device featuring simplicity and ease of assembly and manufacture, which can comprise a rechargeable power source and be produced at a cost permitting relatively competative pricing thereof.

Summary of the invention

Briefly, the invention comprises a unitary basal member defining a pair of oppositely opening compartments, one of which contains operational components normally inaccessible to a user and which is sealed by a headlamp assembly, and the other of which is accessible to the user through an integral hinged cover and which contains for storage components necessary to the versatile operation of the device, i.e. a plug and a transformer assembly. A cantilevered handle facilitates handling of the device, and a burnished metal collar member provides both aesthetic appeal and structural support.

Brief description of the drawing

A better understanding of the invention may be had by reference to the following detailed description of a preferred embodiment thereof taken in connection with the accompanying drawings, wherein:

FIGURE 3 is a cross-sectional side elevation showing a plug extending exteriorly of the device;
FIGURE 4 is a schematic diagram depicting the electrical circuitry arrangement.

Description of the preferred embodiment

Figure 8:
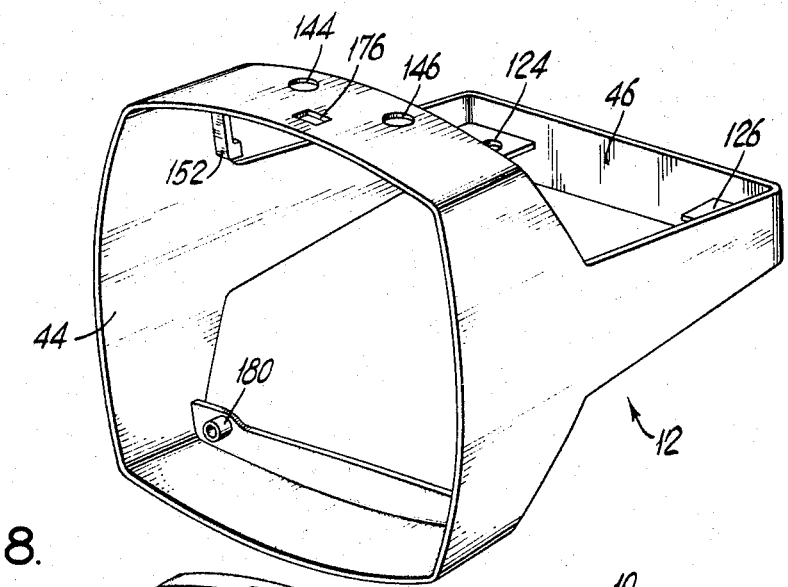
FIGURE 8 is an exploded isometric view showing the front of the basal member, the collar member and the electrical circuit component.
Figure 8:
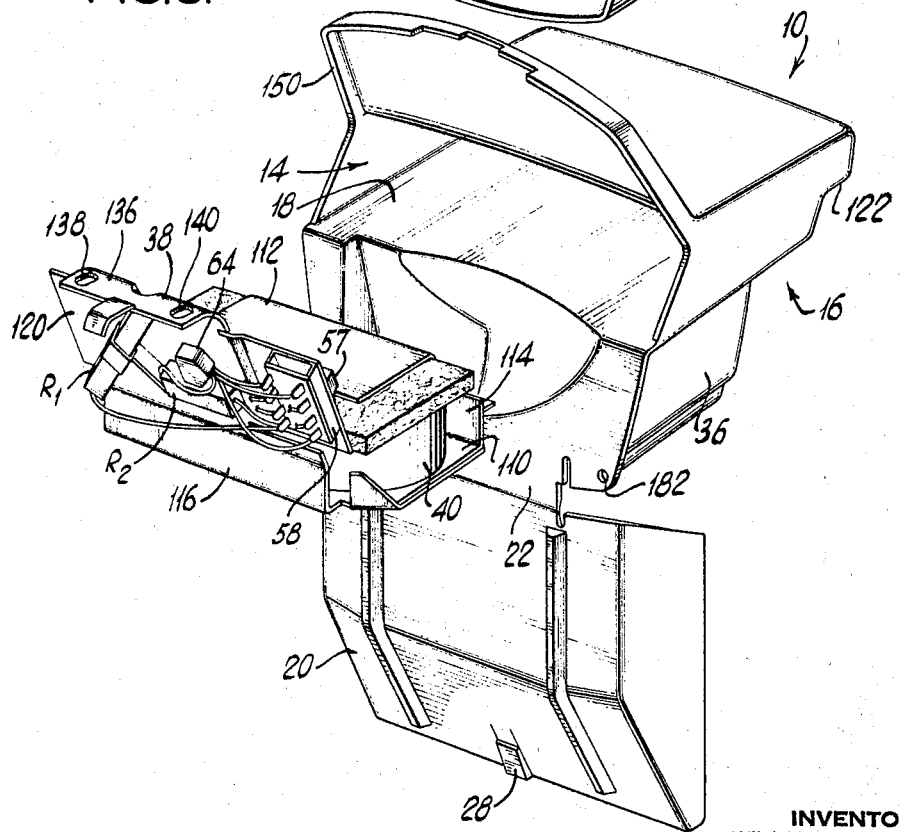
Figure 9:
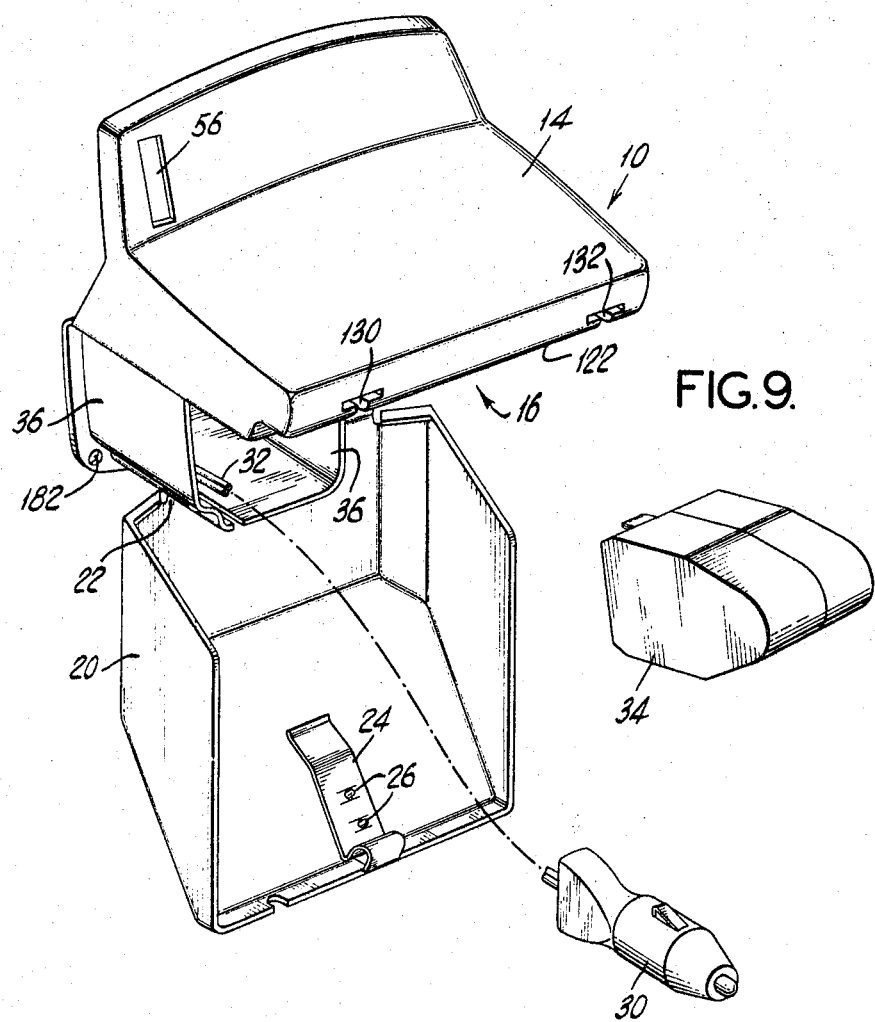
FIGURE 9 is an exploded isometric view showing the rear of the basal member with the plug and transformer assembly.

The most important structural elements which give rise to the essential features of the invention are a polypropylene basal member 10 and a collar member 12. As best seen in FIGURES 8 and 9, the basal member 10 is formed as a unitary molded plastic structure, and although polypropylene is utilized in the particular embodiment described herein it should be understood that other synthetic thermoplastic resinous materials may be utilized. The basal member 10 is generally comprised of an upper compartment 14 and a lower compartment 16 separated by a wall 18, with each compartment opening in a direction opposite to the other, i.e. the upper compartment 14 opens forwardly while the lower compartment 16 opens rearwardly. The lower compartment 16 is enclosed by a hinged cover 20 which is integrally formed with the basal member 10 through a plastic hinge section 22 which is flexible and which may be formed of the same material as the basal member 10.

Formation of the hinge 22 is accomplished, in a manner well known in the art, by forming the material along the section 22 of a thinner configuration than the material which comprises other portions of the basal member 10. The thinning of section 22 comprises part of the molding operation, and as has been stated, the procedures involved form no part of the present invention but relate to matters well known in the art of forming thermoplastic materials.

The cover 20 includes a flexible strip 24, mounted upon cover 20 by clip pins 26 or any other suitable means, which operates to latch the cover 20 in a closed position, with a button 28 being provided exteriorly of cover 20 which when pressed inwardly will flex strip 24 thereby disengaging the latch and effecting opening of lower section 16 by swinging of cover 20 to the position shown in FIGURE 9.

The functional elements of the lighting device of the present invention are all attached or mounted within or upon the basal member 10. Within the lower compartment 16 there is mounted for storing a plug member 30 with its interconnecting wire 32 and a transformer assembly 34. The plug 30 and wire 32 may be conveniently stored within a sub-compartment defined by a U-shaped wall 36, with the transformer assembly 34 being stored in the space immediately adjacent wall 36 and to the right side thereof as viewed in FIGURE 9. The plug 30 and transformer assembly 34 can therefore be carried about inside the lighting device assembly in a very convenient manner and be ready for use when needed, in a manner to be described hereinafter.

The upper compartment 14, which will be generally inaccessible to the user, contains the electrical circuitry component 38 which includes internal battery means 40 which comprises, in the case of the preferred embodiment described herein, a pair of rechargeable nickel-cadmium batteries.

As best shown in FIGURE 3, the electrical circuitry component 38 fits appropriately into upper compartment 14, and with it in place, a headlamp assembly 42 is mounted into the front face of the lighting device.

The collar member 12, which serves both a decorative and a functional purpose, comprises a quasi-rectangular front portion 44 which surrounds the headlamp assembly 42, and an integral U-shaped rear portion 46 which extends completely around the rear of the basal member 10. The collar member 12 of the embodiment described herein is formed as a unitary metal piece with the exterior surface thereof having a burnished surface to enhance the attractiveness of the device. The collar member 12 also serves functionally as a sort of anchor or mounting support structure, as will become apparent as more details of the present invention become disclosed hereinafter.

A cantilevered handle 48, formed of a solid plastic body with a hollow front chamber 49, is mounted upon the upper quarter of front portion 44 of collar member 12, and contains a button 50 which activates a switch assembly 52, contained within the front chamber 49, to turn the lighting device on and off, with a front plate 54 being provided upon which may be imprinted identifying indicia, such as a manufacturer's trademark.

The lighting device of the present invention may be operated in a variety of modes. It may be:

(1) Operated from the internal battery means contained therein;

(2) Operated from a special outlet such as the cigarette lighter outlet of an automobile; and (3) Recharged from an ordinary household outlet or from a special outlet such as an automobile cigarette lighter outlet.

The basal member 10 comprises a cut away portion 56 through which protrudes the selector button 57 of a selector switch assembly 58 which controls operation of the lighting device to one of the three modes discussed above. The circuitry whereby this versatility of operation is accomplished is shown schematically in FIGURE 4.

The circuitry of FIGURE 4 comprises a lamp 60, which is mounted within the lamp assembly 42, and a switch 62 which is mounted within the switch assembly 52. The internal battery means are shown schematically at 40, and the selector switch assembly 58 is also shown schematically within the dotted lines as comprising a three-position switch. A bridge network 64 comprising diodes 66a, 66b, 66c and 66d, is connected through resistors $R_1$ and $R_2$ to plug 30 which is shown schematically in FIGURE 4 as comprising contacts 30a and 30b. The transformer assembly 34 includes therein a transformer T having a primary winding $T_1$ and a secondary winding $T_2$, as well as contact members 34a and 34b, all of which are shown schematically in FIGURE 4. In order to connect the transformer T of assembly 34 to the lighting device, the plug 30 is inserted into an opening in transformer assembly 34 defined by cylindrical wall 68. With plug 30 so positioned, contacts 30a and 34a will connect, as will contacts 30b and 34b.

The switch assembly 58 includes a pair of contacts $C_1$, $C_2$ connected across the bridge network 64, a pair of contacts $B_1$, $B_2$ connected across the internal battery 40, a pair of contacts $L_1$, $L_2$ connected across the lamp 60, and a pair of contacts $P_1$, $P_2$ connected respectively to contacts 30a, 30b of plug 34.

In determining a mode of operation for the lighting device, a selection is made from the operational modes (1) to (3) described previously, and depending upon the selection made, the selector switch 58 is placed in one of three positions by appropriately moving selector button 57.

If it is desired to effect operational mode (1), button 57 is moved to a position where contact pair $B_1$, $B_2$ is connected to contact pair $L_1$, $L_2$, thereby placing the voltage of internal battery 40 across the lamp 60 when switch 62 is closed. With button 57 maintained in this position the lamp 60 may be turned on and off merely by depressing button 50 thereby opening and closing switch 62.

When it is desired to effect operational mode (2), the button 57 is moved to a position where contact pair $L_1$, $L_2$ is connected to contact pair $P_1$, $P_2$ thereby placing the lamp 60 across contacts 30a, 30b of plug 30 through resistor $R_2$, and also placing lamp 60 across bridge 64 through resistor $R_1$. With the plug 30 connected to an automobile cigarette lighter outlet, opening and closing of switch 62 will operate to turn lamp 60 on and off in the manner previously described. In this mode of operation, the resistors $R_1$ and $R_2$ serve as voltage limiters to prevent currrent surge from damaging the lamp 60.

Figure 1:
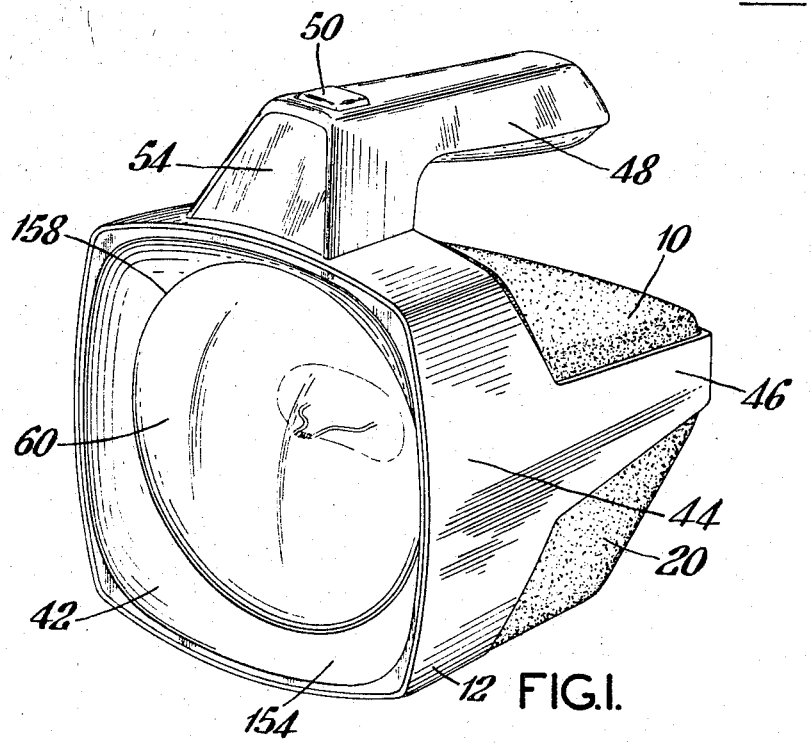
FIGURE 1 is an isometric front view of the assembled device of the invention.
Figure 2:
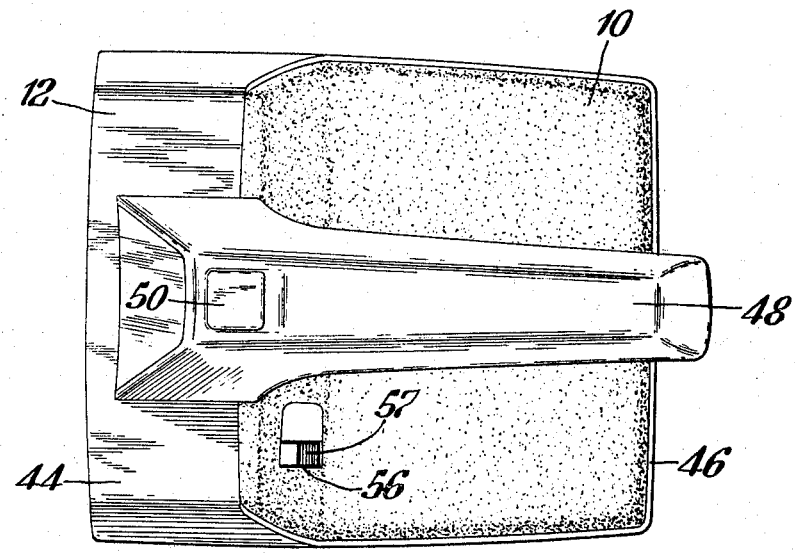
FIGURE 2 is a top plan view thereof.
Figure 5:
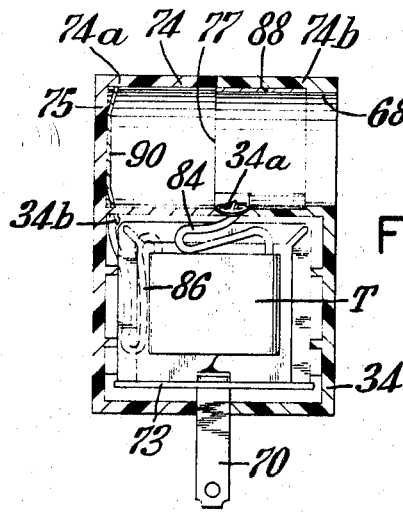
FIGURE 5 is a cross-sectional side view of the transformer assembly of the invention.
Figure 6:
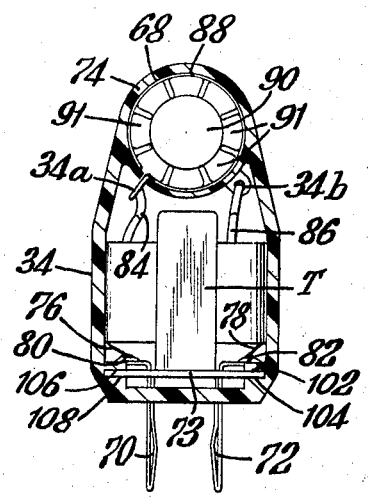
FIGURE 6 is a cross-sectional front view of the transformer assembly of the invention.

When it is desired to effect operational mode (3) it becomes necessary to utilize the transformer assembly 34, whose structure and operation will now be described in detail with particular reference to FIGURES 5 and 6.

In operation, the transformer assembly 34 may be connected to an ordinary household outlet by means of connector prongs 70, 72 which are mounted upon a plate 73 of electrically insulating material held within a two-piece plastic housing 74 and connected to the primary $T_1$ of transformer T by a pair of wire leads 76 and 78 which, together with the prongs 70, 72 are fastened to the plate 73 by a pair of fastening means 80, 82 which may be rivets or the like. A pair of leads 84 and 86 connect, through soldered connections at 34a and 34b, the secondary $T_2$ of transformer T, respectively, to a discontinuous cylindrical spring metal band 88 and to a leafed plate 90. The metal band 88 is maintained by a radial spring force which compresses the band within the cylindrical surface 68 of assembly 34. The plate 90 is likewise maintained in place against rear wall 75 of housing 74 by a spring force developed by abutment of the edges of leaves 91 against cylindrical surface 68.

The plastic housing 74 is divided into two sections 74a and 74b along a line 77 which bisects housing 74. It will be noted that plate 73 extends into both sections 74a and 74b of housing 74. The plate 73 is retained between surfaces 102 and 104 on one side thereof, and between surfaces 106 and 108 along its opposite side. The fit between these surfaces is fairly tight, and the frictional engagement developed thereby serves as the force maintaining plate 73 firmly in place. After they have been appropriately assembled as shown, the sections 74a and 74b may be sealed together by any appropriate means, the means utilized in the present embodiment being ultrasonic welding. The plate 73 also serves to mount transformer T which has its bottom portion fastened to plate 73 by any suitable means.

When plug 30 is inserted into cylindrical opening 68 in transformer assembly 34, contact member 30b will connect with leafed plate 90 and contact member 30a will connect with band 88 thereby placing the contacts 30a, 30b across the secondary $T_2$ of transformer T. With the prongs 70, 72 inserted into an ordinary household electrical outlet, operational mode (3) may be effected by moving button 57 so that switch 58 interconnects contact pair $B_1$, $B_2$ with contact pair $C_1$, $C_2$. With the circuitry in this condition the bridge 64 will prevent alternating current from reaching the battery 40, in a manner which will be obvious to those skilled in the art, and accordingly the current derived from the ordinary household outlet supply will be across $T_1$ of the transformer T and will operate through transformer T to recharge battery 40. Of course, a similar recharging operation may be effected merely by inserting plug 30 into a special outlet such as an automobile cigarette lighter outlet, instead of into transformer assembly 34, with basically the same results.

Accordingly, it will be apparent that the invention involves significant versatility of operation, such versatility being afforded in a manner providing significant ease and facility. All of the components needed for the full range of operation may be conveniently stored and carried about within the lighting device, and this will be apparent from the fact that the plug 30 and the transformer assembly 34 require no cumbersome auxiliary storage receptacle, and are conveniently held in compartment 16.

Almost all of the circuitry depicted schematically in FIGURE 4 is mounted upon the electrical circuitry component 38 which, as shown, comprises a one-piece metal sheet cut and bent to an appropriate shape. The bottom section of component 38, which mounts the internal battery means 40, comprises a bottom wall 110 and a top wall 112 with a pair of upstanding side walls 114 and 116. The internal battery means 40 are disc shaped and are positioned within the walls 110, 112, 114, and 116. A pad 118 of any appropriate soft material serves to hold the batteries 40 in place and to cushion against shock.

Wall 116 has extending therefrom integral slanted wall 120 upon which are mounted many of the electrical components such as the switch 58, resistors $R_1$ and $R_2$ and bridge 64, all appropriately held in a firm manner and having the necessary soldered wiring connections.

In assembling the lighting device of the present invention, the basal member 10 is placed within the collar member 12 with a ledge 122 formed at the rear of the basal member 10 being positioned upon a pair of lips 124 and 126 formed at the corners of U-shaped portion 46. The electrical circuitry component 38 is then slid into upper section 14 of basal member 10 with a pair of screws 128, only one of which is shown, extending through holes in lips 124 and 126, through openings 130 and 132 in ledge 122, and through threaded holes in a lip 134 formed integrally with bottom wall 110 of component 38, to firmly provide a connection at the indicated points. As will be apparent from FIGURE 3, access to the heads of screws 128 may be had by opening hinged cover 20.

The slanted wall 120 has a lip 136 integrally formed therewith with a pair of openings 138 and 140 therein through which extend a pair of screws 142, only one of of which is shown. The screws 142 also extend through openings 144 and 146 in collar member 12 to a threaded opening 148 in a portion of handle 48 thereby providing a firm mounting at the upper front portion of the lighting device. A lip 150 on basal member 10 abuts a ledge 152, extending around the interior of the upper quarter of quasi-rectangular portion 44, only part of which is shown in FIGURE 8, with the lip 150 being firmly held between lip 136 and the upper quarter of portion 44 when screws 142 are in place.

With the components thus in place, the headlamp assembly 42 may then be mounted over the front of the unit.

Figure 7:
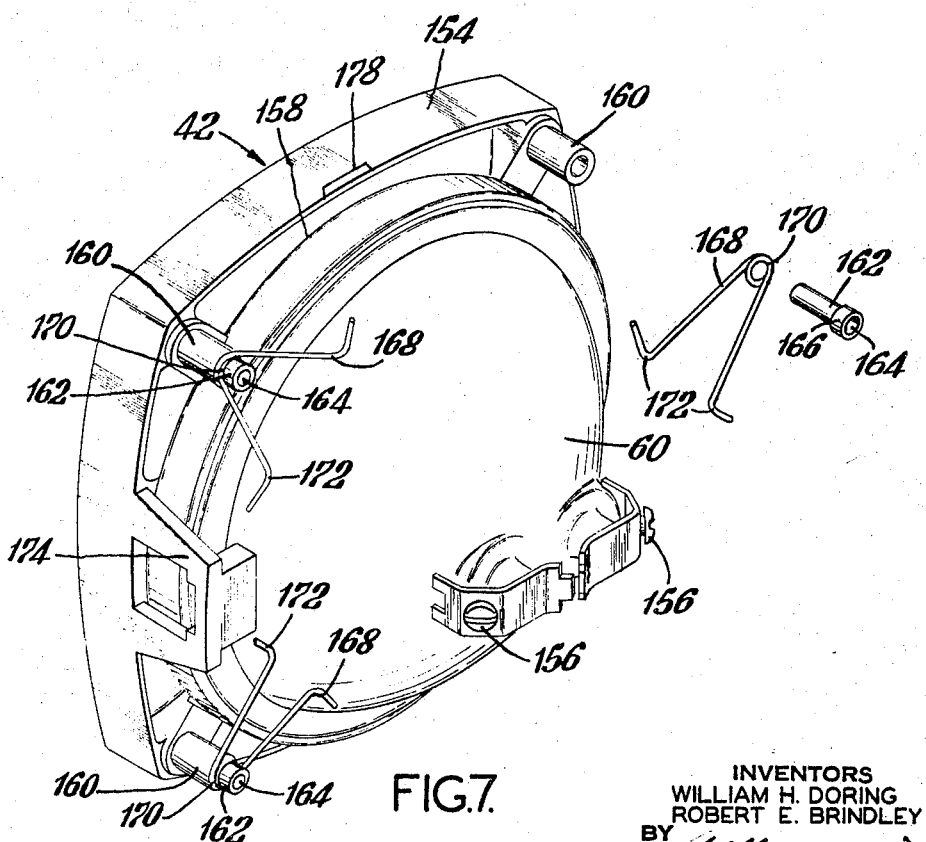
FIGURE 7 is an isometric partially exploded view showing the headlamp assembly of the invention.

The headlamp assembly 42 is shown in FIGURE 7 and comprises basically a plastic frame 154 and a sealed beam headlamp 60 which is a commercially available item comprising the usual electrical connectors 156 at the rear thereof. The frame 154 comprises a circular inner rim 158 adapted to fit the headlamp 60, and four posts 160, only three of which are shown. Each post 160 has mounted therein a pin 162 having an internally threaded opening 164. The pins 162 comprise an enlarged head section 166 and when mounted firmly within posts 160 they serve to rotatably secure four spring clips 168, only three of which are shown, to the posts 160. The spring clips 168 comprise circular sections 170, the inner diameters of which are smaller than the head section 166 of pin 162 but large enough to permit passage therethrough of the smaller-diameter body of pins 162.

The spring clips are V-shaped with the ends of the legs thereof being bent back to form corners 172. With the spring clips 168 held in place upon posts 160 by the pins 162, the spring clips 168 may be rotated about post 160, and with the headlamp 60 in place the corners 172 will bear against the rear convex surface of the headlamp thereby holding the headlamp in place by the spring force of spring clip 168. When it is desired to remove the headlamp, it is only necessary to rotate the spring clips 168 away from the rear surface of the lamp. A post 174 may be shaped to the contour of portions of headlamp 60 thereby to serve as a guide means for appropriately positioning the lamp within the frame 154 prior to placing the spring clips 168 in the holding position.

The outer surfaces of frame 154 are shaped similarly to the inner surface of quasi-rectangular front portion 44 of collar member 12. When mounting the headlamp assembly 42, a tab 137 protruding from the lip 136 on slanted wall 120 extends through an opening 176 in front portion 44, and the headlamp assembly 12 is placed so that this lip engages a notch 178 in the upper surface of frame 154. A pair of screws (not shown) may then be inserted through openings 180 (one only shown) in collar member 12 and through openings 182 (one only shown) in basal member 10, to engage the threaded inner opening 164 of the two lowermost pins 162 thereby firmly holding the headlamp assembly 42 in place.

Of course, prior to mounting of headlamp assembly 42 appropriate wire connections must be made from electrical connectors 156 to the switch assembly 58 mounted upon slanted wall 120.

Additionally, it should also be noted that the internal battery means 40 will also require wire connections to the switch assembly 58, and this may be accomplished in any appropriate manner, for example, by providing openings (not shown) in the bottom of wall 110 of component 38 thereby permitting the attachment by soldered connections or by other appropriate means of wire leads from the battery 40 to the switch assembly 58.

What is claimed is:
1. In a rechargeable portable lighting device the combination comprising a unitary basal member defining a first and a second compartment, said compartments opening in opposing directions and separated by a common wall, a collar member including support means, said collar member having a portion thereof surrounding the opening of said first compartment with a U-shaped integral section extending around said basal member, said first compartment having mounted therein a unitary electrical circuit component including electrical circuit means and rechargeable battery means, said second compartment having a hinged cover permitting access thereto, means for storing within said second compartment electrical current supply means for said lighting device, and a lamp assembly firmly mounted to cover the opening to said first compartment.

2. The combination according to claim 1 wherein said basal member is formed in one piece including said hinged cover from molded synthetic thermoplastic resinous material, said hinged cover being operable through a flexible section of said material of reduced thickness.

3. The combination according to claim 1 comprising a one-piece member of sheet material having appropriately formed folds and openings therein whereby said electrical circuit means and said battery means are firmly mounted thereon to form said unitary electrical circuitry component in a manner facilitating appropriate electrical connection thereof in said lighting device, said unitary electrical circuitry component being shaped to efficiently occupy said first compartment and comprising means for firmly mounting said component therein.

4. The combination according to claim 3 wherein said unitary electrical circuitry component includes selector switch means effective to permit operation of said lighting device from either external electrical current supply means or from said rechargeable battery means, and also permitting recharging of said battery means, said selector switch means being mounted upon said one-piece sheet member and extending through an opening defined by said basal member to permit access thereto by a user.

5. The combination according to claim 1 wherein said second compartment comprises means for storing a plug and a transformer assembly therein, access thereto being provided by manipulation of said hinged cover, said transformer assembly being operable to accept current from an ordinary household electrical outlet and engageable by said plug means for recharging of said battery means.

6. The combination according to claim 1 comprising handle means formed of an elongated member extending from the top of said portion of said collar member surrounding the opening of said first compartment, said handle means enclosing switch means for turning said lamp on and off said switch means being positioned adjacent said collar member.

7. The combination according to claim 1 wherein said lamp assembly comprises a lamp, unitary frame means fitted to and surrounding said lamp in a manner whereby an edge of the front face of said lamp is congruent to an inner surface of said frame means defining an opening through which said lamp is visible, a plurality of post means on the rear of said frame means, and spring means rotatably mounted upon said post means for detachably supporting said lamp upon said frame means.

8. The combination according to claim 1 including a cantilevered handle having switch means therein for turning said lamp on or off, said lamp assembly comprising internally-threaded screw means, the further improvement comprising means whereby said basal member, said collar member, said lamp assembly, said handle and switch means, and said unitary electrical circuitry component are assembled together by six screw connections.

9. The combination according to claim 8 whereby four of said six screw connections are accessible from said second compartment, two of said four including screw connections adapted to be received into said internally-threaded screw means in the rear of said lamp assembly frame means, the remaining two of said six screw connections being accessible at the opening of said first compartment upon removal therefrom of said lamp assembly.

10. The combination according to claim 7 whereby said post means include internally-threaded screw means engageable by screws extending through said basal member and said collar member from said second compartment firmly mounting said lamp assembly in the opening of said first compartment.

References Cited

UNITED STATES PATENTS

| | | | |
|---|---|---|---|
| 2,233,377 | 2/1941 | Talbot | 240—10.63 |
| 2,582,330 | 1/1952 | Hautala | 240—10.6 |
| 2,628,339 | 2/1953 | Werner | 240—10.6 X |
| 3,003,057 | 10/1961 | Cheng | 240—10.63 |

NORTON ANSHER, *Primary Examiner.*

W. A. SIVERTSON, *Assistant Examiner.*

U.S. Cl. X.R.

240—8.18